Patented Nov. 1, 1949

2,486,530

UNITED STATES PATENT OFFICE 2,486,530

MANGANATE TYPE CONTACT MASS AND PRODUCTION THEREOF

Leslie G. Jenness, Buffalo, N. Y., assignor to The Linde Air Products Company, a corporation of Ohio No Drawing. Application July 3, 1942,
Serial No. 449,686

9 Claims. (Cl. 252—186)

This invention relates to a novel manganate type contact mass for separating and collecting gaseous oxygen of high purity from the atmosphere. More particularly, the chemical contact mass for producing oxygen according to the invention is an improvement on the contact mass of DuMotay and Marechal disclosed in United States Patent 70,705 of November 12, 1867. The invention also relates to a novel process for producing the novel contact mass.

The oxygen producing process of DuMotay et al. is performed by alternately passing air and steam through a closed retort over a hot alkali manganate reaction mass having the ability to be oxidized by the passage of air thereover, and thereafter to be deoxidized and release gaseous oxygen during the passage of steam thereover. The reversible reaction theoretically is:

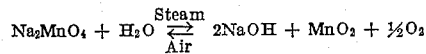

$$Na_2MnO_4 + H_2O \underset{Air}{\overset{Steam}{\rightleftarrows}} 2NaOH + MnO_2 + \tfrac{1}{2}O_2$$

During the air phase of the DuMotay et al. cycle, the oxygen is absorbed from the air by the hot contact mass, and the residual nitrogen passes off and may be collected if desired. During the steam phase of the cycle, gaseous oxygen is released from the contact mass and is collected, while the residual steam discharged with the oxygen is separated from the oxygen by condensation.

It has been found that, although the basic DuMotay et al. process operates satisfactorily to produce fairly large quantities of oxygen initially, the rate of oxygen production rapidly decreases to a quite low level. Moreover, the contact mass used by DuMotay et al. has proved to be quite unstable because it tends to separate or stratify into its constituents after having been in operation for a short time. The basic DuMotay et al. process also requires huge quantities of steam for the production of oxygen on a large scale, such as 1000 cu. ft./hr., thus requiring relatively large and expensive equipment and making the cost of operation prohibitive. For these reasons, the basic process of DuMotay et al. has not been commercially successful in competition with other methods of producing oxygen, because the process has proved to be economically unprofitable.

Several attempts have been made by subsequent investigators to improve the basic DuMotay et al. process to permit the production of oxygen on a profitable basis. Among the better known of these improvements is that proposed by George Kaszner in United States Patent 1,015,566 of January 23, 1912, which teaches the addition to the alkali manganate contact mass of an alkali meta-plumbate, such as sodium meta-plumbate, for increased stability. Despite the alleged improvement in the stability of the reaction mass, however, there has proved to be no substantial increase in the oxygen production rate, nor in the efficiency of oxygen production based on the quantities of steam and air supplied to the mass. Furthermore, experiments have shown that Kaszner's "Plumboxan" mass rapidly decreases in activity when in use, probably because of volatilization of the lead compound. Kaszner's process, therefore, also has proved to be prohibitive in cost in competition with other commercial processes for producing oxygen.

In the processes of the DuMotay type known prior to the present invention, the manganate contact mass was prepared by intimately mixing manganese dioxide or manganese sesquioxide with a quantity of an alkali hydroxide, such as sodium hydroxide, in the proportions theoretically required to produce the compound $Na_2MnO_4$ having the atomic ratio of 2 atoms of sodium to 1 atom of manganese, there sometimes being present a slight excess of the alkali hydroxide. After sintering of the mixture in air, the resulting mass was broken up and placed in a retort, and the steam-air cycle commenced. Masses produced in this manner are characterized by a low apparent density of between about 0.65 and 0.70, thus requiring a large bulk of mass for the production of oxygen on a large scale. Furthermore, as mentioned above in connection with the DuMotay et al. process, the mass is relatively unstable. The economic failure of prior processes of this type, therefore, may be attributed in large part to these poor characteristics of the alkali manganate contact masses employed, coupled with the excessively large steam requirements for oxygen production on a large scale.

An object of the present invention is to provide a novel chemical contact mass for producing oxygen from the air without the disadvantages of the prior processes discussed above. Another object is the provision of a novel contact mass for producing oxygen by the alternate passage of air and steam over such a hot reaction mass, by which oxygen may be produced at a high rate over a long period of time with a relatively low steam consumption, and a relatively small weight and bulk of mass. Another object is the provision of such a contact mass for producing high yields of oxygen over a long period of time without excessive deterioration of the contact mass. Still another object is the provision of such a contact mass whereby a high stabilized rate of oxygen production is obtained. Another object is the provision of such contact mass whereby oxygen may be produced on a large scale at a low cost and with equipment of relatively small size requiring a small initial investment. Another object is to provide such a contact mass which will permit the construction of a portable, large capacity, self-contained oxygen plant capable of being mounted on a mobile transportation unit.

Another object of the invention is the provision of a novel contact mass characterized by its superior stability and its high apparent density.

Another object is the provision of a novel process for producing the novel contact mass of the invention.

The above and other objects, and the novel features of the invention, will become apparent from the following detailed description.

Basically, the novel process for producing the novel contact mass of this invention comprises sintering together at a high temperature an intimate mixture of a substance selected from the group consisting of the oxidic compounds of the alkali or alkaline earth metals with an oxide of manganese in a lower state of oxidation than manganese dioxide. The oxidic compound of the alkali or alkaline earth metal is included in the mixture in an amount less than that stoichiometrically required to form a manganate compound with all of the manganese present in the mixture, thus providing for the presence of free oxide of manganese in the contact mass. Preferably, sodium hydroxide or potassium hydroxide is used in producing the contact mass, although the hydroxides of the other alkali metals and of the alkaline earth metals are also suitable.

For simplicity, and not by way of limitation, the following detailed description will relate to the production of a contact mass by using sodium or potassium hydroxides, and to the process for producing oxygen with the novel contact mass so produced. It is to be understood, however, that other oxidic compounds of the alkali and alkaline earth metals may be used, such as oxides and carbonates.

In the preferred form of the process for producing the novel manganate contact mass of this invention, involving two distinct steps, a quantity of manganese dioxide is first reduced to a lower state of oxidation by heating it at about 2200° F., preferably in a reducing atmosphere such as is provided by neutral gas or the normal gas atmosphere of a direct-fired gas furnace. The use of a reducing gas atmosphere is desirable, but not essential, since good results also may be obtained in an atmosphere of air. Preferably, the manganese dioxide is reduced to an available oxygen content corresponding to $Mn_3O_4$ by chemical analysis, although reduction to an available oxygen content corresponding to $Mn_2O_3$, or to a mixture of $Mn_3O_4$ and $Mn_2O_3$, will give satisfactory results. The available oxygen content is the oxygen content of the mass in excess of the quantity of oxygen required to form $MnO$ with all of the manganese present.

The reduced manganese dioxide then is mixed intimately with a quantity of solid sodium hydroxide sufficient to provide an atomic ratio of sodium to manganese of between 8 and 10 to 6, and preferably 8 to 6. When $Mn_3O_4$ is used, the alkali hydroxide such as sodium or potassium hydroxide is added in an amount calculated to produce theoretically a substance having the empirical composition $2Mn_3O_4.4R_2O$ wherein R represents an alkali metal.

The mixture then is loaded into a fire clay crucible and sintered in a furnace at a temperature of about 2190° F. It is important that the temperature, and the atmosphere in which the sintering step is performed, be adjusted to maintain most of the oxide of manganese in the reduced condition. A non-oxidizing atmosphere, such as an atmosphere of nitrogen, may be maintained in the sintering furnace to promote the formation of the desired contact mass. However, it has been found that a more stable mass is obtained by sintering the mixture in a reducing atmosphere, such as is present in a direct-fired gas furnace. Satisfactory results also are obtainable when air or oxygen atmospheres are used, however.

The temperature of sintering the mass may be varied to some extent between about 1830° F. and 2190° F., but temperatures lower than about 2190° F. favor the formation of a mass which is less stable, and therefore gives a less uniform rate of oxygen production when it is used in the air-steam cycling process. The higher the alkali ratio above the preferred ratio of 8 to 6, the lower is the temperature required for preparing the mass; and the lower the state of manganese oxidation maintained during preparation of the mass, the better will be the stability of the mass. Moreover, the higher the sintering temperature, the greater is the density of the resulting mass. These observations also apply to the one-step modification of the process described hereinafter.

The following examples are illustrative of the two-step modification of the process:

*Example 1*

A contact mass was prepared by first heating a charge of 3¼ lbs. of manganese dioxide (91.8% $MnO_2$) in the reducing atmosphere of a direct-fired gas furnace at a temperature of 2100° F. for a period of 1½ hrs., the available oxygen content thus being reduced to 7.40% corresponding approximately to the composition $Mn_3O_4$.

The reduced manganese dioxide was then mixed with sodium hydroxide in the proportions of 855 grams of reduced manganese dioxide to 645 grams of sodium hydroxide (76% $Na_2O$), and heated at 2190° F. in a furnace for 1½ hrs. in a nitrogen atmosphere. The mass was then broken up and sized to between 4 and 20 mesh Tyler.

A sample of this contact mass was charged into a retort and cycled with air and steam alternately at a temperature of 1200° F. and a pressure of 60 lbs./sq. in. After a short period of operation, the oxygen yield became constant at a rate of 0.49 cu. ft./hr., and a constant rate of production was maintained for a period of six days thereafter.

*Example 2*

Manganese dioxide was reduced as in Example 1, but heating was only continued for 1 hour, after which the available oxygen content was 10.39, corresponding approximately to the composition $Mn_2O_3$.

The reduced manganese dioxide was then mixed with potassium hydroxide in the proportions of 760 grams of reduced manganese dioxide to 740 grams of potassium hydroxide, and the mixture sintered and sized as in Example 1.

A sample of this contact mass was cycled with air and steam alternately at a temperature of 1200° F. and a pressure of 75 lbs./sq. in., giving an oxygen yield of 0.47 cu. ft./hr. immediately. This yield was maintained constant for a period of ten days thereafter.

A second form of the process for producing the contact mass of the invention is a one step process, wherein manganese dioxide is intimately mixed with the proper quantity of solid sodium hydroxide, and the mixture is then sintered at a high temperature in a non-oxidizing atmosphere, and preferably in a reducing atmosphere. As in the preferred modification discussed above, the proportions of the components of the mixture are preferably adjusted before sintering to produce a substance having the empirical formula $2Mn_3O_4.4Na_2O$. The temperature of sintering is about 2190° F., preferably in a natural gas atmosphere or in the reducing atmosphere of a direct-fired gas furnace.

The improved contact mass may be obtained by either of the two procedures discussed above, using substantially pure manganese dioxide as a starting material. However, from a practical standpoint, it is desirable that the contact mass be prepared from a manganese ore, such as a pyrolusite ore, which contains for instance about 72% manganese dioxide. The procedure is substantially identical with either of the two forms of process discussed above, but, because the ore normally contains about 12% silica, an excess of sodium hydroxide must be added to combine with the silica. The excess amount of sodium hydroxide should be enough to form sodium silicate ($Na_2SiO_3$) with the silica. Masses also may be prepared, in accordance with the invention, containing other additions such as compounds of aluminum, molybdenum, or boron, enough sodium hydroxide being introduced to react theoretically with all of the addition material.

The following examples are illustrative of the one-step and two-step modifications, using pyrolusite ore as a starting material.

*Example 3*

In a one-step process, 1048 grams of manganese dioxide ore containing 47.36% Mn, 11.74% available oxygen, and 11.74% silica, were mixed with 652 grams of sodium hydroxide, corresponding to an atomic ratio of 6 manganese to 8 sodium, with sufficient excess sodium to react with the silica in the ore. This mixture was then sintered by heating it at a temperature of 2190° F. for 1½ hours in the reducing atmosphere of a direct-fired gas furnace. This mass was cooled and sized to between 4 and 20 mesh Tyler.

A sample of the contact mass was then cycled with air and steam alternately at a temperature of 1200° F. and a pressure of 75 lbs./sq. in. The initial oxygen production rate was 0.90 cu. ft./hr., but stabilized at about 0.56 cu. ft./hr. and remained at this rate constantly for a period of four days thereafter.

*Example 4*

In a two-step process, one ton of the ore described in Example 3 was reduced to an available oxygen content of 6.26% by heating it at 1470° F. in the reducing atmosphere of a direct-fired gas furnace.

The reduced ore was then mixed with sodium hydroxide in proportions to produce a mixture of 42% NaOH and 58% ore, and rabbled at 2190° F. on the hearth of a direct-fired gas furnace, after which the mass was cooled and sized to between 4 and 20 mesh Tyler. Chemical analysis showed this mass to contain sodium and manganese in an atomic ratio of 8 to 6, and with sufficient excess sodium to react with the silica present in the ore.

A sample of this contact mass, when cycled with steam and air at 1200° F. and 75 lbs./sq. in. gave a constant oxygen yield of 0.52 cu. ft./hr. over a period of twenty days.

The contact mass produced by either form of the process previously discussed consists of a heterogeneous mixture of simple and complex manganates, but is also characterized by the presence of uncombined lower oxides of manganese. No exact chemical formula can be assigned to the novel composition, because of this heterogeneity. However, the mass has several easily recognizable characteristics by which it may be distinguished from the contact masses of the prior art.

For example, masses prepared in accordance with the two forms of the process discussed above have an apparent density in the pulverulent condition of between 0.85 and 1.1. The density is inversely proportional to the available oxygen content of the oxide of manganese used, the lower density resulting from the use of reduced manganese dioxide having an available oxygen content corresponding to $Mn_2O_3$, and the higher density from $Mn_3O_4$. In contrast, masses prepared by sintering manganese dioxide and sodium hydroxide in the proportions theoretically required to produce the compound $Na_2MnO_4$ possess a low apparent density of between 0.62 and 0.65.

As another distinction, the preferred contact mass of this invention shows, upon analysis, the empirical composition $2Mn_3O_4.4Na_2O$, there being present sodium and manganese in the proportions of about 8 to 6. The empirical composition, of course, is based on the quantity of sodium hydroxide which theoretically is combined with the manganese oxide, and excludes the amount of sodium hydroxide equivalent to the silica present in pyrolusite ore when such ore is the starting material. Likewise, if other compounds such as compounds of aluminum, molybdenum, or boron are present, the sodium hydroxide equivalents of these compounds must be excluded when establishing the empirical composition. Other characteristic properties of the novel contact mass of this invention will be apparent from a consideration of the following description of the process of producing oxygen with this contact mass.

The process of producing oxygen follows generally the procedure taught by DuMotay et al., and expressed theoretically in the equation reproduced in the first part of this application. The contact mass is first disintegrated and sized to pass through screens between 4 and 20 mesh Tyler in size, and is then loaded into a retort and heated to a temperature of between about 1150° and 1250° F. Air and steam preheated to high temperatures are then alternately passed through the mass, the time for each phase being selected on the basis of the best rate of oxygen production, but usually being between three and five minutes per phase. During the air phase of the cycle oxygen is extracted from the air, and the residual nitrogen, together with any excess oxygen, is discharged from the retort and may be collected or not, as desired. During the steam phase of the cycle the steam passing through the contact mass liberates gaseous oxygen which passes with the steam to a condenser wherein the steam is condensed. The oxygen is then collected in a holder, or is compressed into cylinders for subsequent use. Apparatus for performing the process is shown diagrammatically in my Patent 2,421,381 issued June 3, 1947.

When a new contact mass is placed in operation, the yield of oxygen initially obtained per pound of mass generally is somewhat different than is obtained after a short period of operation. The rate of oxygen production gradually changes from the initial yield level until it reaches a different level at which the production rate is stabilized. Oxygen production then continues at that stabilized rate for the major portion of the life of the mass.

With the contact mass prepared according to the one-step process discussed above, the stabilized oxygen yield level is usually about 70% of the initial oxygen yield rate. With the preferred contact mass, prepared by the two-step process of first reducing manganese dioxide and then sintering it with sodium hydroxide, the initial oxygen yield rate may be relatively low, but gradually rises to a stabilized yield level which is comparable to the 70% stabilized yield level of the mass prepared by the one-step process.

The process of producing oxygen discussed above operates to the best advantage when at least the steam, but preferably both the air and steam, are maintained at super atmospheric pressures, preferably above 2 atmospheres absolute by a substantial amount. In operation of the process under pressure the rate of oxygen production is directly proportional to the absolute atmospheres of pressure. Operation of the process at super atmospheric pressure is described and claimed in my Patent 2,421,381.

Pressure operation of the process accentuates an important advantageous property of those masses which are prepared in a reducing atmosphere. Such contact masses are more difficult of oxidation on the air phase of the process than those prepared in an oxidizing or neutral atmosphere. Consequently, the process may be operated at a higher temperature than has been possible with other masses, yet without maintaining the air pressure lower than the steam pressure. The higher rate of oxygen production obtainable at the higher temperature thus is available without danger of rendering the mass inactive by too high air flows or pressures. In general, the mass has a slower oxidizing rate the lower the state of oxidation of the oxide of manganese used, the higher the temperature at which the mass is sintered, and the more reducing the atmosphere in which the sintering is performed.

Masses prepared from manganese dioxide ore such as pyrolusite as a starting material exhibit somewhat unusual properties. For example, the density of the mass increases with the temperature of sintering, this increase being particularly rapid above 1920° F. Also, the initial yield of oxygen per unit weight of mass increases with the temperature of sintering from 1470° F. to 1830° F. Above 1920° F., for sintering the mass, the initial oxygen yield drops off with further increase in temperature. However, when the mass is sintered at 2200° F. in a nitrogen atmosphere, the oxygen yield rate stabilizes at a level equal to 75% of the initial yield rate, in contrast to a stabilized yield rate level equal to only 50% of the initial yield rate when the mass is sintered at 1830° F. It is apparent, therefore, that the temperature at which the contact mass is sintered exerts a strong influence on the characteristics of the mass.

Contact masses prepared by the process of this invention not only give improved yields of oxygen, but also are characterized by excellent stability in operation. The masses will not deteriorate rapidly, nor will they lose much of their ability to produce oxygen at high rates over long periods of use. The absence of free sodium hydroxide and the presence of excess manganese oxide in the mass are believed to be two factors giving improved stability.

Another characteristic of the novel contact mass, and the improved process of operation with the novel mass, is the high yield product obtained in oxygen production. The yield product, which is an arbitrary figure calculated by multiplying the oxygen yield per pound of mass by the apparent density of the mass, determines to a large extent the size of the retort or reaction vessel required to hold the contact mass for a desired rate of oxygen production. The size of the reaction vessel is an important element in determining the cost and bulk of a plant for producing oxygen according to this process. Using the dense and highly productive contact mass of the present invention, a plant may be constructed capable of producing 1000 cu. ft./hr. of oxygen, yet of such a small size that all of the necessary equipment may be mounted upon a single truck-drawn trailer or other transportation unit and carried from place to place.

The invention has been described above, by way of example only, as applied to a contact mass and a process of producing oxygen therewith, wherein sodium or potassium hydroxides are sintered with an oxide of manganese to produce the mass. It is to be understood, however, that the process is also operable satisfactorily upon contact masses wherein the oxide of manganese is sintered with any oxidic compound of any of the alkali metals, as well as with oxidic compounds of the alkaline earth metals. Furthermore, while the best results are obtained by operating the process with air and steam at high pressures, improved results also are obtained by operating the process with air and steam at atmospheric pressures.

What is claimed is:

1. A process for producing a contact mass which comprises reducing manganese dioxide to to a lower state of oxidation, and sintering together at a high temperature above 1830° F. the resulting oxide or oxides of manganese with at least one substance selected from the group consisting of the oxides, hydroxides and carbonates of the alkali and alkaline earth metals, in intimate admixture therewith.

2. A process for producing a contact mass which comprises intimately mixing together an oxide of manganese and at least one substance selected from the group consisting of the oxides, hydroxides, and carbonates of the alkali and alkaline earth metals, and sintering the mixture at a high temperature above 1830° F. in a reducing atmosphere.

3. A process as claimed in claim 2 wherein such substance is mixed with said oxide of manganese in the proportions of between 8 and 10 atoms of the metal selected from the group consisting of the alkali and alkaline earth metals to 6 atoms of manganese.

4. A process for producing a manganate type contact mass which comprises intimately mixing manganese dioxide with at least one substance selected from the group consisting of the oxides, hydroxides, and carbonates of the alkali and alkaline earth metals, and sintering the mixture at a temperature above 1830° F. in a reducing atmosphere such that the manganese dioxide is at least partially reduced to and maintained in a lower state of oxidation.

5. A sintered solid contact mass consisting essentially of a substance having the empirical composition $2Mn_3O_4.4R_2O$, wherein R is alkali metal said mass having a density between 0.85 and 1.1.

6. A process for producing a contact mass which comprises intimately mixing manganese dioxide with at least one substance selected from the group consisting of alkali and alkaline earth metal oxides, hydroxides, and carbonates in the proportion of between about 8 and 10 atoms of said metal to about 6 atoms of manganese, and sintering the mixture at a high temperature above 1830° F. in a reducing atmosphere.

7. A process for producing a contact mass which comprises reducing manganese dioxide to a lower state of oxidation, intimately mixing the reduced manganese dioxide with a substance selected from the group consisting of the oxides, hydroxides, and carbonates of the alkali and alkaline earth metals, and sintering the mixture at a high temperature above 1830° F. in a reducing atmosphere.

8. A process as claimed in claim 1 wherein such substance is mixed with said oxide of manganese in the proportions of between 8 and 10 atoms of the metal selected from the group consisting of the alkali and alkaline earth metals to 6 atoms of manganese.

9. A solid manganate type contact mass which is a solid sintered material consisting essentially of complexes of manganese, oxygen, and an alkali metal, said material having a composition and relationship of the elements such as theoretically to form a salt $2Mn_3O_4.yR_2O$, wherein R is an alkali metal and $y$ is from 4 to 5, said mass having an apparent density between .85 and 1.1.

LESLIE G. JENNESS.

REFERENCES CITED

The following references are of record in the file of this patent:

UNITED STATES PATENTS

| Number | Name | Date |
| --- | --- | --- |
| 70,705 | DuMotay et al. | Nov. 12, 1867 |
| 500,697 | Webb, Jr., et al. | July 4, 1893 |
| 505,809 | Bowman | Oct. 3, 1893 |
| 515,443 | Parkinson | Feb. 27, 1894 |
| 1,015,566 | Kraszner | Jan. 23, 1912 |
| 1,074,501 | Granjon | Sept. 30, 1913 |
| 1,271,013 | Bosch et al. | July 2, 1918 |
| 1,291,751 | Brewster | Jan. 21, 1919 |
| 1,421,271 | McNeil | June 27, 1922 |
| 1,855,676 | Holt et al. | Apr. 26, 1932 |
| 1,937,488 | Jenness | Nov. 28, 1933 |
| 2,086,507 | Larson | July 6, 1937 |
| 2,103,220 | Jenness | Dec. 21, 1937 |
| 2,245,495 | Pemble | June 10, 1941 |